United States Patent
Majumdar et al.

(10) Patent No.: US 9,116,873 B2
(45) Date of Patent: Aug. 25, 2015

(54) METHODS, SYSTEMS, AND COMPUTER READABLE MEDIA FOR ADJUSTING LOAD AT A DEVICE UNDER TEST

(71) Applicant: Ixia, Calabasas, CA (US)

(72) Inventors: Partha Majumdar, Woodland Hills, CA (US); Pratik Ganguly, West Bengal (IN); Sirshendu Rakshit, West Bengal (IN); Rohan Chitradurga, Simi Valley, CA (US)

(73) Assignee: IXIA, Calabasas, CA (US)

( * ) Notice: Subject to any disclaimer, the term of this patent is extended or adjusted under 35 U.S.C. 154(b) by 86 days.

(21) Appl. No.: 13/871,909

(22) Filed: Apr. 26, 2013

(65) Prior Publication Data

US 2014/0289561 A1    Sep. 25, 2014

(30) Foreign Application Priority Data

Mar. 21, 2013    (IN) .............................. 857/DEL/2013

(51) Int. Cl.
  *G06F 11/00*    (2006.01)
  *G06F 11/263*    (2006.01)
(52) U.S. Cl.
  CPC ................................... *G06F 11/263* (2013.01)
(58) Field of Classification Search
  USPC .......................................................... 714/25
  See application file for complete search history.

(56) References Cited

U.S. PATENT DOCUMENTS

| | | |
|---|---|---|
| 5,247,517 A | 9/1993 | Ross et al. |
| 5,327,437 A * | 7/1994 | Balzer ........................... 714/736 |
| 5,343,463 A | 8/1994 | van Tetering et al. |
| 5,477,531 A | 12/1995 | McKee |
| 5,535,338 A | 7/1996 | Krause et al. |
| 5,568,471 A | 10/1996 | Hershey et al. |
| 5,590,285 A | 12/1996 | Krause et al. |
| 5,600,632 A | 2/1997 | Schulman |
| 5,657,438 A | 8/1997 | Wygodny |
| 5,671,351 A | 9/1997 | Wild |
| 5,761,486 A | 6/1998 | Watanabe |
| 5,787,253 A | 7/1998 | McCreery et al. |
| 5,838,919 A | 11/1998 | Schwaller et al. |

(Continued)

FOREIGN PATENT DOCUMENTS

EP    0 895 375 B1    8/2004

OTHER PUBLICATIONS

"Ixload Specifications," http://web.archive.org/web/20120704122725//www.ixiacom.com/products/network_test/applications/ixload/specifications/index.php pp. 1-7, (Jul. 4, 2012).

(Continued)

*Primary Examiner* — Kamini Patel
(74) *Attorney, Agent, or Firm* — Jenkins, Wilson, Taylor & Hunt, P.A.

(57) ABSTRACT

Methods, systems, and computer readable media for adjusting load at a device under test are disclosed. According to one method, the method occurs at a testing platform. The method includes determining whether a current operations rate associated with a device under test (DUT) is near a target operations rate, wherein the current operations rate is associated with one or more simulated users being simulated by the testing platform. The method also includes adjusting the current operations rate by increasing or decreasing the number of simulated users interacting with the DUT in response to determining that the current operations rate associated with the DUT is not near a target operations rate.

21 Claims, 12 Drawing Sheets

(56) References Cited

U.S. PATENT DOCUMENTS

| | | | |
|---|---|---|---|
| 5,878,032 A | 3/1999 | Mirek et al. | |
| 5,881,237 A | 3/1999 | Schwaller et al. | |
| 5,905,713 A | 5/1999 | Anderson et al. | |
| 5,937,165 A | 8/1999 | Schwaller et al. | |
| 5,974,237 A | 10/1999 | Shurmer et al. | |
| 6,028,847 A | 2/2000 | Beanland | |
| 6,044,091 A | 3/2000 | Kim | |
| 6,061,725 A | 5/2000 | Schwaller et al. | |
| 6,065,137 A * | 5/2000 | Dunsmore et al. | 714/37 |
| 6,108,800 A | 8/2000 | Asawa | |
| 6,122,670 A | 9/2000 | Bennett et al. | |
| 6,148,277 A | 11/2000 | Asava | |
| 6,157,955 A | 12/2000 | Narad et al. | |
| 6,172,989 B1 | 1/2001 | Yanagihara et al. | |
| 6,173,333 B1 | 1/2001 | Jolitz | |
| 6,189,031 B1 | 2/2001 | Badger | |
| 6,233,256 B1 | 5/2001 | Dieterich et al. | |
| 6,279,124 B1 | 8/2001 | Brouwer | |
| 6,321,264 B1 | 11/2001 | Fletcher | |
| 6,345,302 B1 | 2/2002 | Bennett et al. | |
| 6,360,332 B1 | 3/2002 | Weinberg | |
| 6,363,056 B1 | 3/2002 | Beigi et al. | |
| 6,397,359 B1 | 5/2002 | Chandra et al. | |
| 6,401,117 B1 | 6/2002 | Narad | |
| 6,408,335 B1 | 6/2002 | Schwaller et al. | |
| 6,421,730 B1 | 7/2002 | Narad | |
| 6,434,513 B1 | 8/2002 | Sherman et al. | |
| 6,446,121 B1 | 9/2002 | Shah | |
| 6,507,923 B1 | 1/2003 | Wall et al. | |
| 6,545,979 B1 | 4/2003 | Poulin | |
| 6,601,098 B1 | 7/2003 | Case | |
| 6,621,805 B1 | 9/2003 | Kondylis et al. | |
| 6,625,648 B1 | 9/2003 | Schwaller et al. | |
| 6,625,689 B2 | 9/2003 | Narad | |
| 6,662,227 B2 | 12/2003 | Boyd et al. | |
| 6,708,224 B1 | 3/2004 | Tsun et al. | |
| 6,763,380 B1 | 7/2004 | Mayton et al. | |
| 6,789,100 B2 | 9/2004 | Nemirovsky | |
| 6,920,407 B2 * | 7/2005 | Adamian et al. | 702/104 |
| 6,950,405 B2 | 9/2005 | Van Gerrevink | |
| 7,006,963 B1 | 2/2006 | Maurer | |
| 7,010,782 B2 | 3/2006 | Narayan et al. | |
| 7,516,216 B2 | 4/2009 | Ginsberg et al. | |
| 8,010,469 B2 | 8/2011 | Kapoor et al. | |
| 8,135,657 B2 | 3/2012 | Kapoor et al. | |
| 8,145,949 B2 * | 3/2012 | Silver | 714/26 |
| 8,341,462 B2 * | 12/2012 | Broda et al. | 714/25 |
| 8,402,313 B1 * | 3/2013 | Pleis et al. | 714/30 |
| 8,510,600 B2 * | 8/2013 | Broda et al. | 714/25 |
| 8,522,089 B2 * | 8/2013 | Jindal | 714/718 |
| 8,676,188 B2 * | 3/2014 | Olgaard | 455/423 |
| 8,839,035 B1 * | 9/2014 | Dimitrovich et al. | 714/25 |
| 2002/0080781 A1 | 6/2002 | Gustavsson | |
| 2003/0009544 A1 | 1/2003 | Wach | |
| 2003/0012141 A1 | 1/2003 | Gerrevink | |
| 2003/0033406 A1 | 2/2003 | John et al. | |
| 2003/0043434 A1 | 3/2003 | Brachmann et al. | |
| 2003/0231741 A1 | 12/2003 | Rancu et al. | |
| 2006/0268933 A1 * | 11/2006 | Kellerer et al. | 370/469 |
| 2008/0285467 A1 * | 11/2008 | Olgaard | 370/242 |
| 2008/0298380 A1 | 12/2008 | Rittmeyer et al. | |
| 2009/0100296 A1 * | 4/2009 | Srinivasan et al. | 714/43 |
| 2009/0100297 A1 * | 4/2009 | Srinivasan et al. | 714/43 |
| 2010/0050040 A1 | 2/2010 | Samuels et al. | |
| 2011/0238855 A1 | 9/2011 | Korsunsky et al. | |
| 2011/0283247 A1 * | 11/2011 | Ho et al. | 716/107 |
| 2012/0192021 A1 * | 7/2012 | Jindal | 714/718 |
| 2012/0240185 A1 | 9/2012 | Kapoor et al. | |
| 2012/0314576 A1 | 12/2012 | Hasegawa et al. | |
| 2013/0111257 A1 * | 5/2013 | Broda et al. | 714/2 |
| 2013/0286860 A1 * | 10/2013 | Dorenbosch et al. | 370/252 |
| 2014/0036700 A1 * | 2/2014 | Majumdar et al. | 370/252 |
| 2014/0160927 A1 * | 6/2014 | Majumdar et al. | 370/235 |
| 2014/0173094 A1 * | 6/2014 | Majumdar et al. | 709/224 |

OTHER PUBLICATIONS

Notice of Allowance and Fee(s) Due for U.S. Appl. No. 13/712,499 (Mar. 11, 2015).

Notice of Allowance and Fee(s) Due for U.S. Appl. No. 13/567,747 (Mar. 5, 2015).

Non-Final Office Action for U.S. Appl. No. 13/718,813 (Jan. 14, 2015).

Non-Final Office Action for U.S. Appl. No. 13/567,747 (Nov. 19, 2014).

Non-Final Office Action for U.S. Appl. No. 13/712,499 (Jul. 14, 2014).

"A TCP Tutorial," ssfnet.org/Exchange/tcp/tcpTutorialNotes.html, pp. 1-10 (Apr. 4, 2012).

"IxLoad," Solution Brief, 915-3030-01. D, Ixia, pp. 1-4 (Feb. 2012).

Notice of Allowance and Fee(s) Due for U.S. Appl. No. 11/462,351 (Feb. 6, 2009).

Restriction Requirement for U.S. Appl. No. 11/462,351 (Jan. 2, 2009).

Ye et al., "Large-Scale Network Parameter Configuration Using an On-line Simulation Framework," Technical report, ECSE Department, Rensselear Polytechnic Institute (2002).

Business Wire, "Ixia's Web Stressing and In-Service Monitoring Products Names Best of Show Finalist at NetWorld+Interop 2001, Atlanta," 2 pages (Sep. 10, 2001).

PRNewsWire, "Caw Network Doubles Performance of Real-World Capacity Assessment Appliance Suite: WebAvalanche and WebReflector Now Generate and Respond to 20,000+ HTTP requests per Second With Over One Million Open Connections," 2 pages (Sep. 10, 2001).

Caw Networks, Inc. and Foundry Networks, Inc., "Caw Networks Performance Brief: Caw Networks and Foundry Networks 140,000 Transactions per Second Assessment," 1 page (Sep. 7, 2001).

MacVittie, "Online Only: CAW's WebReflector Makes Load-Testing a Cakewalk," Network Computing, 2 pages (Sep. 3, 2001).

Business Wire, "Reminder/Caw Networks to Spotlight WebAvalanche 2.0 and WebReflector at Networld+Interop," 2 pages (May 8, 2001).

"Caw Networks Unveils New Web-Stressing Appliance," press release from Caw Networks, Inc., 2 pages (Mar. 5, 2001).

Ye et al., "Network Management and Control Using collaborative On-Line Simulation," Proc. IEEE International Conference on Communications ICC2001, Helsinki, Finland, pp. 1-8 (2001).

Business Wire, "NetIQ's Chariot 4.0 Goes Internet-Scale; ASPs and Service Providers Can Conduct Tests With Up to 10,000 Connections; New Visual Test Designer Simplifies Testing of All Sizes," 1 page (Oct. 23, 2000).

Business Wire, "Spirient Communications TeraMetrics and NetIQ's Chariot Work Together to Create First Complete Network Performance Analysis Solution," 2 pages (Sep. 25, 2000).

Kovac, "Validate your equipment performance—Netcom Systems' SmartBits—Hardware Review—Evaluation," Communications News, 2 pages (May 2000).

Marchette, "A Statistical Method for Profiling Network Traffic," USENIX (Apr. 12-19, 1999).

Cooper et al., "Session traces: an enhancement to network simulator," Performance, computing and Communications Conference, Scottsdale, AZ (Feb. 1, 1999).

San-qi, et al., "SMAQ: A Measurement-Based Tool for Traffic Modeling and Queuing Analysis Part I; Design methodologies and software architecture," IEEE Communications Magazine, pp. 56-65 (Aug. 1, 1998).

San-qi, et al., "SMAQ: A Measurement-Based Tool for Traffic Modeling and Queuing Analysis Part II; Network Applications," IEEE Communications Magazine, pp. 66-77 (Aug. 1, 1998).

Mneimneh, "Computer Networks Flow control with TCP," pp. 1-5 (Publication Date Unknown).

* cited by examiner

METHODS, SYSTEMS, AND COMPUTER READABLE MEDIA FOR ADJUSTING LOAD AT A DEVICE UNDER TEST

PRIORITY CLAIM

This application claims the benefit of Indian Provisional Patent Application No. 857/DEL/2013, filed Mar. 21, 2013; the disclosure of which is incorporated herein by reference in its entirety.

TECHNICAL FIELD

The subject matter described herein relates to testing communications nodes. More specifically, the subject matter relates to methods, systems, and computer readable media for adjusting load at a device under test.

BACKGROUND

In communications networks, network devices are often tested using testing platforms that generate test packets, send the packets to a device under test, receive responsive packets from the device under test, and generate statistics indicative of the performance of the device under test. For example, in mobile networks, it may be desirable to test the functionality of a serving gateway (SGW) by sending streams of test packets to the SGW. In some tests, the streams of test packets mimic the traffic that would be received by such a node if the node were operating in a live network. In other tests, the goal is to send streams of packets that test the extremes of the operational capabilities or stress test the device under test.

In some test environments e.g., when testing layer 7 (L7) content aware network devices, it may be important to find out the maximum limit of various data rates a device under test can sustain. For example, various data rates that can be tested may include a connection establishment rate, a L7 transaction rate, a L7 byte exchange or throughput rate. A performance benchmarking or testing tool may test an, actual data rate against a desired target operations rate by attempting to maintain the target operations rate throughout a testing period. Conventional test tools have problems maintaining a target operations rate at a device under test throughout a testing period.

Accordingly, in light of these difficulties, a need exists for improved methods, systems, and computer readable media for adjusting load at a device under test.

SUMMARY

Methods, systems, and computer readable media for adjusting load at a device under test are disclosed. According to one method, the method occurs at a testing platform. The method includes determining whether a current operations rate associated with a device under test (DUT) is near a target operations rate, wherein the current operations rate is associated with one or more simulated users being simulated by the testing platform. The method also includes adjusting the current operations rate by increasing or decreasing the one or more simulated users interacting with the DUT in response to determining that the current operations rate associated with the DUT is not near a target operations rate.

A system for adjusting load at a device under test is also disclosed. The system includes a testing platform. The testing platform includes a load adjustment controller comprising at least one processor and memory. The load adjustment controller is configured to determine whether a current operations rate associated with a device' under test (DUT) is near a target operations rate, wherein the current operations rate is associated with one or more simulated users being simulated by the testing platform, and in response to determining that the current operations rate associated with the DUT is not near a target operations rate, to adjust the current operations rate by increasing or decreasing the one or more simulated users interacting with the DUT.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein. In some embodiments, a module may include a hardware-based circuit, a field-programmable gateway array (FPGA), an application-specific integrated circuit (ASIC), or software executed by a processor.

BRIEF DESCRIPTION OF THE DRAWINGS

The subject matter described herein will now be explained with reference to the accompanying drawings of which.

DETAILED DESCRIPTION

Figure 1:
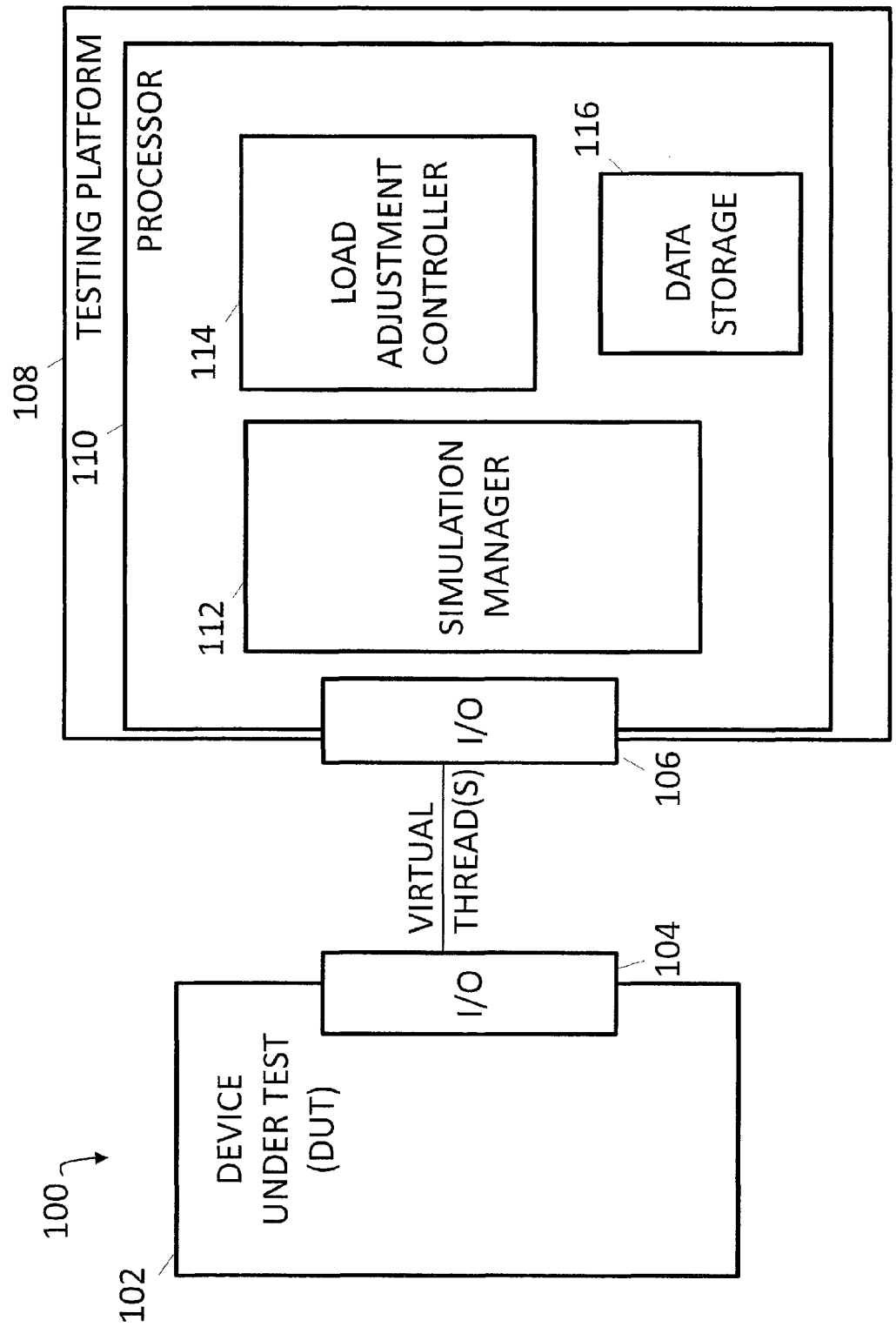
FIG. 1 is a diagram illustrating an exemplary device for adjusting load at a device under test according to an embodiment of the subject matter described herein.

The subject matter described herein discloses methods, systems, and computer readable media for adjusting load at a device under test (DUT). When testing networks and/or network equipment, it may be desirable to test the response of the network and other equipment under non-trivial load conditions.

Various test objectives may be measured using one or more data processing rates, such as a connection establishment rate, an L7 transaction rate, an L7 byte exchange or throughput rate. Generally, a device under test may be associated with a target operations rate. In some embodiments, the target operations rate may be the maximum operations rate sustainable or obtainable for a given device and configuration. The target operations rate may be based on hardware, software, configuration parameters, or predefined, e.g., by a test operator. An ideal testing platform may attempt to maintain a target operations rate for a device under test during a testing period. However, problems may arise when trying to maintain a target operations rate. One problem includes processing variance associated with testing environments related to L7 communications. For example, processing demands may decrease as commands or actions are waiting to be received while processing demands may increase after commands and actions are received. Another problem involves estimating data processing rates at a DUT so as to identify a current operations rate and/or maintain a target operations rate.

Advantageously, the subject matter described herein includes aspects that involve generalizing one or more data processing rates as a load or operations rate, such as operations per second (OPS) or per another time interval, like per 10 milliseconds. The subject matter described herein also includes aspects for estimating a load (e.g., an OPS value) based on a number of simulated users executing operations concurrently (e.g., processed in parallel). For example, a testing platform in accordance with aspects of the present subject matter may simulate users. Each simulate user may be associated with a sequence of action or commands, also referred to as a virtual thread. For example, the sequence or virtual thread may include instructions for setting up a data session and/or requesting data from sources via the Internet. In some embodiments, a virtual thread may be programmed via a scripting language or other mechanism.

Advantageously, the subject matter described herein includes aspects for adjusting load at a DUT. In some embodiments, adjusting load includes determining an optimum number of simulated users or associated virtual threads for maintaining or obtaining a target operations rate. For example, a testing platform in accordance with aspects of the present subject matter may adjust the number of parallel or concurrent executions of a virtual thread (e.g., by increasing or decreasing the number of simulated users). Since the number of virtual threads can directly impact the load on a device under test, the testing platform can adjust the load on the DUT to obtain and/or maintain a target operations rate (e.g., a maximum OPS value).

FIG. 1 is a diagram illustrating an exemplary network 100 for adjusting load at a device under test according to an embodiment of the subject matter described herein. Network 100 may include a device under test (DUT) 102, a testing platform 108 (testing platform may be on both sides of the device), and input/output (I/O) modules 104 and 106. DUT 102 may represent any suitable entity (e.g., a serving gateway, a packet data network gateway, a network node, a base transceiver station (BTS), node B, eNode B, a WiMAX base station, a server load balancer, a firewall, a deep packet inspection device, etc.) for providing data via an air (e.g., wireless) or wire interface. For example, DUT 102 may be a serving gateway that provides data via a tunneling protocol.

I/O 104 may represent any suitable entity (e.g., a network interface card (NIC)) for controlling and/or performing I/O functions; sending communications from DUT 102 or receiving communications destined for DUT 102. In some embodiments, I/O 104 may be distinct from or integrated with DUT 102. I/O 104 may perform analog-to-digital and/or digital-to-analog conversion and may include one or more wireless interfaces and/or wire interfaces. I/O 104 may also include operation and management processing capabilities and/or a standardized optical interface to connect to one or more components. I/O 104 may communicate using various communications protocols. For example, I/O 104 may be connected to DUT 102 via one or more fiber optic cable using a common public radio interface (CPRI) protocol or may be connected via another interface or using other protocols.

I/O 106 may be associated with testing platform 108 and may include functionality similar to I/O 104. For example, I/O 106 represent any suitable entity for controlling and/or performing I/O functions; e.g., sending communications from testing platform 108 or receiving communications destined for testing platform 108. In some embodiments, I/O 106 may be distinct from or integrated with testing platform 108. For example, I/O 106 may be located at a NIC or associated with one or more processors in testing platform 108.

Testing platform 108 may be any suitable entity (e.g., a stand-alone node or distributed multi-node system) configured to perform one or more aspects associated with testing DUT 102. In some embodiments, testing platform 108 may be a stand-alone tool, a testing device, or software executing on a processor. In some embodiments, testing platform 108 may be a single node or may be distributed across multiple computing platforms or nodes.

In some embodiments, testing platform 108 may be integrated or co-located with a multiple user equipment simulator (multi-UE simulator). The multi-UE simulator may include functionality for simulating one or more users and their respective UEs, sending communications to DUT 102, receiving communications from DUT 102, and/or testing communications capabilities of DUT 102. For example, testing platform 108 may be configured to generate control plane commands that triggers DUT 102 to establish one or more tunnels (e.g., TCP connections, GTP tunnels, IPSec tunnels, etc.) for numerous simulated UEs to communicate with a packet data network, such as the Internet. In another example, testing platform 108 may be configured to generate data requests to one or more entities that appear to come from one or a plurality of simulated users.

In some embodiments, testing platform 108 may simulate one or more evolved packet core (EPC) nodes. For example, testing platform 108 may be an LTE mobile network entity having functionality similar to that of a radio network controller (RNC) and a base station (BS) in 2G networks or an RNC and a Node B in 3G mobile networks. In some embodiments, testing platform 108 may be responsible for header compression, ciphering, reliable delivery of packets, admission control, and radio resource management.

Testing platform 108 may include a processor 110. Processor 110 may be any suitable entity (e.g., an ASIC, a FPGA, or software executing on a processor) for receiving data, transmitting data, and/or processing data. For example, processor 110 may receive data from or transmit data to DUT 102 via a port or connection. In some embodiments, processor 110 may include functionality for communicating with I/O 106 via CPRI or other protocols. For example, a CPRI interface and/or link may provide data from I/O 106 to processor 110 and vice versa.

Processor 110 may include a simulation manager 112, a load adjustment controller 114, and data storage 116. Simulation manager 112 may represent any suitable entity (e.g., software executing on processor 110) for simulating one or more users and/or communicating with DUT 102. In some embodiments, simulation manager 112 may include functionality substantially similar to a multi-UE simulator as described above. Simulation manager 112 may include functionality for converting or transforming data between various protocols and/or layers (e.g., Internet protocol suite layers). Simulation manager 112 may also include functionality for executing virtual threads, such as L7 commands or actions that simulate real traffic associated with UEs. For example, simulation manager 112 may be configured to receive, transmit, and/or process control plane data and/or user plane data associated with communications involving simulated users. Simulation manager 112 may interact with one or more components associated with testing platform 108, such as data storage 116 and/or load adjustment controller 114.

In some embodiments, virtual threads may include instructions for communicating with one or more entities, such as DUT 102 or another entity. The instructions may include commands, actions, or responses associated with a simulated user, where the simulated user may be different for each instance of the virtual thread. The instructions may also include functionality for waiting for communications from one or more entities and responding accordingly. For example, a virtual thread may include instructions for requesting a video from a file server via DUT 102. The virtual thread may also include instructions for waiting for a response from the file server and may include various instructions to handle different possible responses.

Load adjustment controller 114 may represent any suitable entity (e.g., software executing on a processor) for determining a target load, adjusting a current load, and/or maintaining a current load at or near a target load level. For example, load adjustment controller 114 may be configured to identify and maintain a desired rate (e.g., a maximum OPS rate or an OPS rate determined by a test operator) for DUT 102. Load adjustment controller 114 may use various techniques to adjust or maintain a load associated with DUT 102.

In some embodiments, a technique for determining an optimum load (e.g., a target load) for DUT 102 include adjusting a number of simulated users and/or virtual threads being executed by one or more processors 110 at testing platform 108. The technique may include monitoring the current load (e.g., an OPS rate) after adjusting the simulated user and/or virtual threads and comparing the current load with prior load data (e.g., previous OPS rates). In some embodiments, adjustments may occur until the current load obtains an optimum load for DUT 102.

In some embodiments, an iterative convergence algorithm may be used to determine determining an optimum load (e.g., a target load) for DUT 102. For example, a first operations rate associated with a virtual thread count or a number of simulated users may be set as a lower bound and a second operations rate associated with a different virtual thread count or a different number of simulated users may be set as an upper bound. In another example, both the lower and upper bounds are detected by the system based on observations when simulation is running. In this example, the iterative convergence algorithm may use a short-range binary search between the bound values or another mechanism to hone in on a virtual thread count or a number of simulated users that results in an operations rate which is closest to a target operations rate.

In some embodiments, load adjustment controller 114 may be configured to monitor and adjust load at DUT 102 by distributing simulated users and/or virtual threads between multiple processors 110 associated with testing platform 108. For example, each processor 110 associated with testing platform 108 may attempt to obtain a target operations rate or load independently other processors 110. In this example, the target operations rate or load may be a portion of the total system's target operations rate or load.

In some embodiments, operations rates associated with virtual threads being executed at multiple processors 110 may be averaged, summed, or extrapolated. For example, in an environment where two processors testing platform 110 or NICs are being used to test DUT 102, if processor 'A' is executing six virtual threads at an operations rate of 500 OPS and if processor 'B' is executing six virtual threads at an operations rate of 700 OPS, then an average operations rate for a virtual thread count of 6 may be 600 OPS. In another example, in an environment where two processors testing platform 110 or NICs are being used to test DUT 102, if processor 'A' is executing six virtual threads at an operations rate of 500 OPS and if processor 'B' is executing six virtual threads at an operations rate of 700 OPS, then the system may include a virtual thread count of 12 and an total operations rate of 1200 OPS.

In some embodiments, load adjustment controller 114 may be configured to monitor a load associated with DUT 102. For example, load may be monitored as an OPS rate, where the rate is determined based on execution progress of one or more virtual threads. In another example, load may be monitored based on one or more feedback mechanisms, such as load report messages sent from DUT 102 to testing platform 108.

In some embodiments, an operations rate may be measured in relation to various time intervals, such as operations per 10 milliseconds or per 100 milliseconds. In some embodiments, operations rates associated with a given virtual thread count may be based on observed rates averaged from multiple samples or readings. In some embodiments, the samples or readings may be scaled and/or based on time intervals less than or greater than a second. In some embodiments, where operations rates are undeterminable for certain intervals, different (e.g., longer) intervals may be used.

In some embodiments, load adjustment controller 114 may be configured to initiate or terminate one or more simulated users and/or virtual threads. For example, load adjustment controller 114 may determine that a current number of simulated users and/or virtual threads should be decreased or increased. In this example, load adjustment controller 114 may inform simulation manager 112 or another entity. In response, simulation manager 112 or another entity may terminate or initiate one or more simulated users and/or virtual threads.

In some embodiments, load adjustment controller 114 may include functionality for selecting and/or configuring one or more simulated users or virtual threads. For example, a test operator via load adjustment controller 114 or a related user interface may select one or more action sequences to include in a virtual thread. In another example, one or more virtual threads or actions therein may be selected dynamically or predetermined based on DUT 102, test conditions, or other factors. In some embodiments, load adjustment controller 114 may select a virtual thread that is identical for all simulated users. For example, simulation manager 112 may be instructed to execute (e.g., in parallel or concurrently) an instance of the same virtual thread for each simulated user. In this example, each virtual thread may perform the same actions or sequences of actions. In some embodiments, load adjustment controller 114 may select different virtual threads for simulated users. For example, some virtual threads may perform different actions than other virtual threads. In this example, simulation manager 112 may be instructed to execute an instance of the same virtual thread for some simulated users and an instance of a different virtual thread for other simulated users.

In some embodiments, a parameter may be configured to limit a change in the number of simulated users. For example, a test operator or load adjustment controller 114 may set a maximum simulated users value that limits the change in the number of simulated users to a predetermined amount. In this example, the maximum simulated users value may be used to ensure that the change in simulated users (e.g., during a testing period) can be achieved quickly without significantly impacting the running traffic.

In some embodiments, a virtual thread may be modified to affect a load differently than an unmodified virtual thread. For example, load adjustment controller 114 may use a modified virtual thread so as to adjust a current load by a smaller amount than adjusting the current load using an unmodified virtual thread. For example, in one testing period, some virtual threads may include instructions for requesting three files from three different file servers, while another virtual thread may include instructions for requesting one file from a file server.

Load adjustment controller 114 may include functionality for generating and providing user interfaces. User interfaces may be used for modifying simulated users, virtual threads, load targets, and/or related test configuration information.

Data storage 116 may include any suitable entity (e.g., a non-transitory computer readable medium) for storing data associated with testing a device. Exemplary stored data may include load and/or rate statistics, one or more sequence of commands to be executed for a simulated user, a count of current simulated users and/or virtual threads, a current operations rate, one or more previous operations rate and associated counts of simulated users and/or virtual threads, and/or a target operations rate. Data storage 116 may be accessible to simulation manager 112, load adjustment controller 114, and/or other entities. In some embodiments, data storage 116 may be integrated with processor 110 or located externally to processor 110.

It will also be appreciated that the above described modules are for illustrative purposes and that features or portions of features described herein may be performed by different and/or additional modules, components, or nodes. For example, testing platform may include one processor 110 and one I/O 106 or may include multiple processors 110 and/or multiple I/Os 106.

Figure 2:
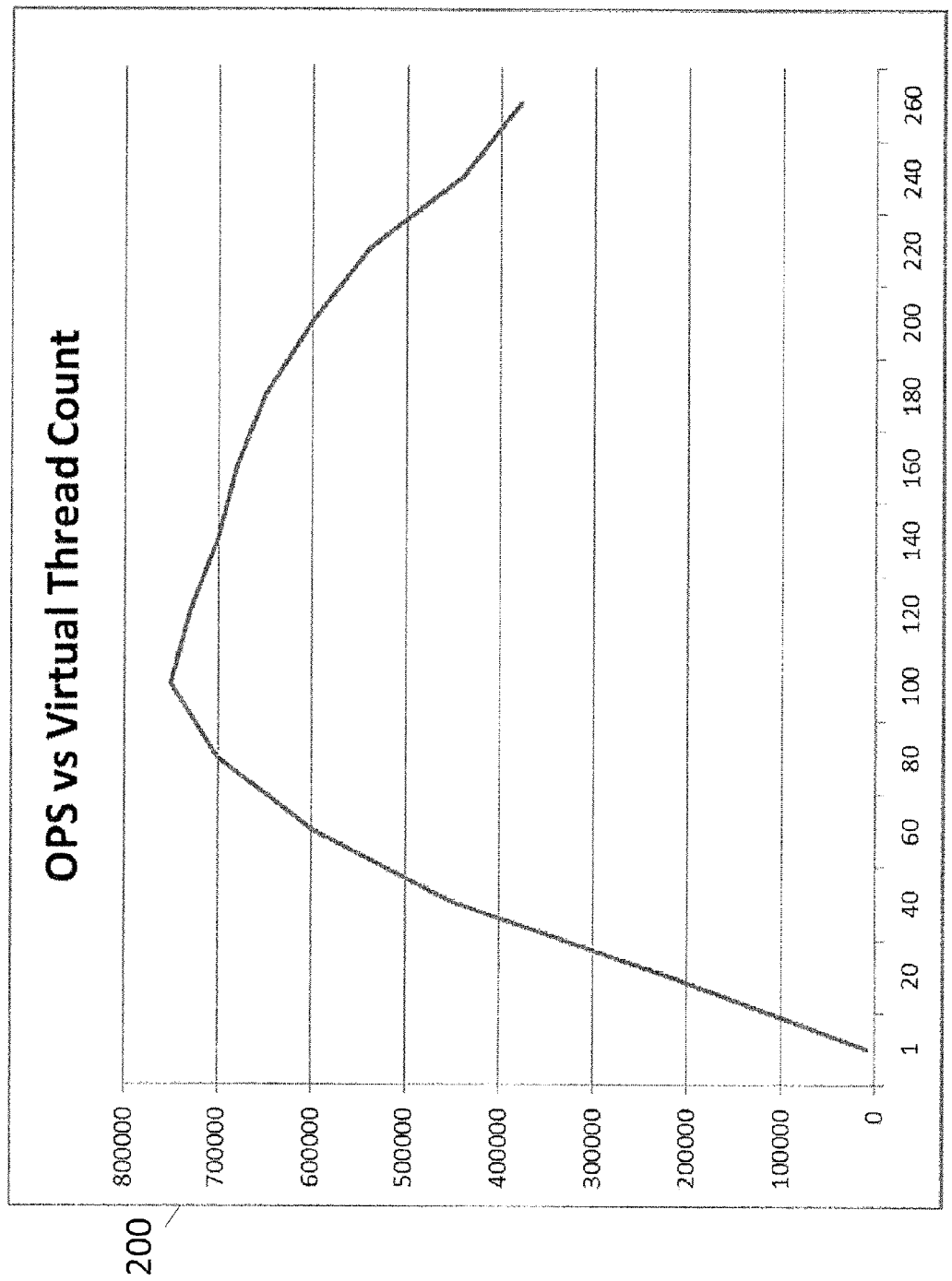
FIG. 2 is a diagram illustrating an exemplary relationship between an operations rate and a virtual thread count according to an embodiment of the subject matter described herein.

FIG. 2 is a diagram illustrating an exemplary relationship between an operations rate and a virtual thread count according to an embodiment of the subject matter described herein. Some aspects of the subject matter described herein involve an assumption that a load or an operations rate (e.g., an OPS rate) may not change if a number of virtual threads being executed (referred to as virtual thread count) does not change. In some embodiments, an operations rate may initially increase with virtual thread count and then the rate may drop. In some embodiments, a single virtual thread may not achieve the maximum or optimum operations rate at DUT 102. For example, with a single virtual thread, a significant portion of time may involve waiting for communications or operations before performing further processing and, as such, processor usage may be low during this waiting stage. By adding more virtual threads to be executed, the operations rate may increase since additional virtual threads may utilize the idle CPU time, e.g., some virtual threads may initiate operations when other virtual threads are waiting.

In some embodiments, after reaching a certain number of virtual threads and/or simulated users, processor usage may be optimally utilized and adding more virtual threads after that may only add to overhead of maintaining virtual threads and context switching between virtual threads. In such embodiments, after processor usage is optimally utilized, any additional virtual threads may reduce the operations rate (e.g., because of increased overhead). For example, a virtual thread count and an operations rate may be positively correlated until a maximum operations rate is obtain after which the virtual thread count and the operations rate may be negatively correlated.

In FIG. 2, a relationship between a virtual thread count and an OPS rate is depicted as curve shaped line. Initially, the OPS rate increases as the number of virtual threads being executed increases. For example, as the number of virtual threads being executed increases from 0 to 100, the OPS rate increases from around 0 OPS to above 700,000 OPS. At or around 100 virtual threads, the OPS rate appears to obtain a rate of around 750,000 OPS. After obtaining a rate of around 750,000 OPS, adding additional virtual threads for execution decreases the OPS rate. For example, as the number of virtual threads being executed increases from 100 to 260, the OPS rate decreases from around 750,000 OPS to less than 400,000 OPS.

It will also be appreciated that the above described relationship is for illustrative purposes and that correlations between virtual threads and an OPS rate may vary depending on one or more factors. For example, correlation may be affected based on number of processors at DUT 102, network conditions, operations or instructions associated with each virtual thread, and/or other factors.

Moreover, while FIG. 2 depicts an OPS rate remaining constant for a given virtual thread count, OPS rates may actually vary during execution of one or more virtual threads. For example, the data points shown in FIG. 2 may be averaged OPS rates or observed OPS rates at some point in time during execution.

Figure 3:
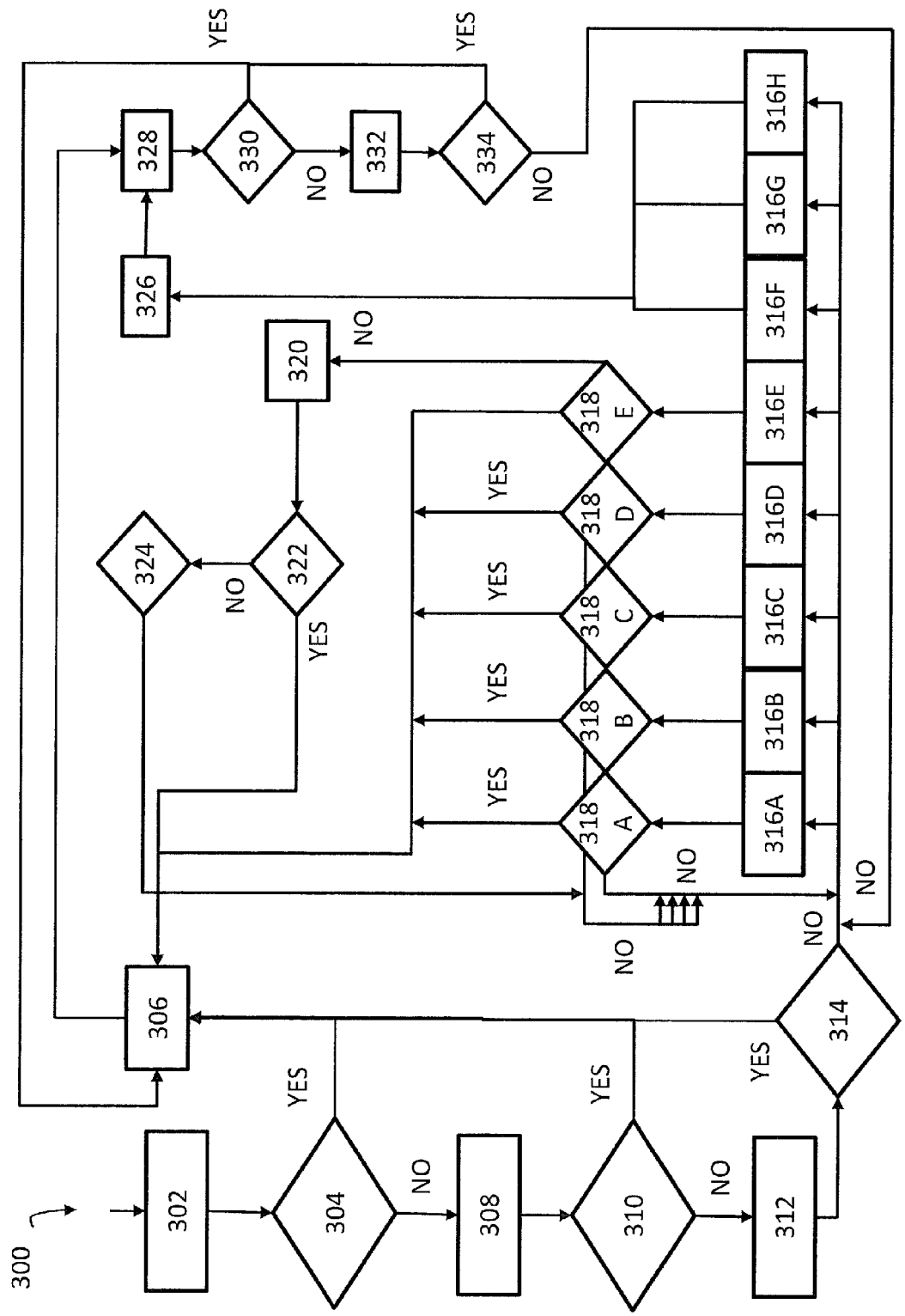
FIG. 3 is a diagram illustrating an exemplary process for determining an optimum virtual thread count for obtaining a target operations rate according to an embodiment of the subject matter described herein.

FIG. 3 is a diagram illustrating an exemplary process 300 for determining an optimum virtual thread count for obtaining a target operations rate or load according to an embodiment of the subject matter described herein. In some embodiments, exemplary process 300, or portions thereof, may be performed by or at testing platform 108, a multi-UE simulator, I/O 106, processor 110, simulation manager 112, load adjustment controller 114, and/or another node or module.

In some embodiments, the target load or target operations rate may be predetermined prior to testing DUT 102. For example, a test operator may identify a target load based on hardware and network resources. In some embodiments, the target load may be the maximum or highest load (e.g., an OPS rate) obtained using one or more techniques described herein. For example, numerous tests may be executed using varying numbers of concurrent virtual threads until a number of concurrent virtual threads is identified as providing an optimum load for DUT 102.

In some embodiments, a virtual thread count may be indicative of a number of simulated users. For example, a virtual thread count of 6 may indicate that six users are being simulated by simulation manager 112 and each simulated user is associated with one virtual thread. In another example, a virtual thread count of 6 may indicate that three users are being simulated by simulation manager 112 and each simulated user is associated with two virtual threads.

Exemplary process 300 may include one or more of steps 302-334. At step 302, a value for virtual thread count 'A' may be selected and a number of virtual threads indicated by the value of virtual thread count 'A' may be concurrently executed for testing DUT 102. After or during execution of a number of virtual threads indicated by the value of virtual thread count 'A', an operations rate associated with virtual thread count 'A' (RATE(A)) may be determined or derived. For example, simulation manager 112 or load adjustment controller 114 may initiate a single virtual thread for testing DUT 102 and, after 20 seconds or after determining that an operations rate is steady, the operations rate may be associated with the virtual thread count 'A'.

At step 304, if RATE(A) is close to a target operations rate (e.g., as determined by a threshold value), step 306 may be performed. If RATE(A) is not close to a target operations rate, a second virtual thread count 'B' may be set to the value of virtual thread count 'A' multiplied by two and step 308 may be performed.

At step 306, virtual thread count 'B' may be set to the value of a last observed virtual thread count. The virtual thread count 'B' may be determined to be an optimum virtual thread count for a current testing period and a number of virtual threads indicated by the value of this virtual thread count may be concurrently executed for testing DUT 102. In some embodiments, additional monitoring may be performed and, if the operations rate associated with this virtual thread count drops, step 328 may be performed. For example, a moving average of an operations rate associated with DUT 102 may be monitored and maintained and, if the rate drop below a certain threshold value, additional adjustment may be performed using re-seek step 328.

In some embodiments, a moving average over a number of time intervals (e.g., 100 samples where each sample is taken every 100 milliseconds) may be used to determine whether a current operations rate has dropped. For example, a moving average may be compared to a target operations rate and if the difference between the target operations rate and the moving average is larger than an acceptable threshold value (e.g., greater than 5% of the target operations rate), the current operations rate may be adjusted.

At step 308, a number of virtual threads indicated by the value of virtual thread count 'B' may be concurrently executed for testing DUT 102 and an operations rate associated with virtual thread count 'B' (RATE(B)) may be determined or derived. For example, simulation manager 112 or load adjustment controller 114 may initiate two concurrent virtual threads for testing DUT 102 and, after an operations rate is steady, the operations rate may be associated with the virtual thread count 'B'.

At step 310, if RATE(B) is close to a target operations rate, step 306 may be performed. If RATE(B) is not close to a target operations rate, another virtual thread count 'C' may be set to the value of virtual thread count 'B' multiplied by two and step 312 may be performed.

At step 312, a number of virtual threads indicated by the value of virtual thread count 'C' may be concurrently executed for testing DUT 102 and an operations rate associated with virtual thread count 'C' (RATE(C)) may be determined or derived. For example, simulation manager 112 or load adjustment controller 114 may initiate four concurrent virtual threads for testing DUT 102 and, after an operations rate is steady, the operations rate may be associated with the virtual thread count 'C'.

At step 310, if RATE(C) is close to a target operations rate, step 306 may be performed. If RATE(C) is not close to a target operations rate, additional processing may be performed.

In some embodiments, additional processing may include comparing the rates associated with virtual thread counts 'A', 'B', and 'C' and performing additional steps depending on a relevant comparison scenario. For example, in one scenario RATE(C) may be greater than RATE(B) and RATE(B) may be greater than RATE(A) and in another scenario RATE(B) may be greater than RATE(C) and RATE(B) may be greater than RATE(A). Depending on the scenario, some thread counts may be adjusted and additional testing may be performed.

FIGS. 4-11 are diagrams illustrating various exemplary scenarios associated with determining an optimum virtual thread count for obtaining a target operations rate according to an embodiment of the subject matter described herein. For example, each diagram may depict a line that illustrates how RATE(A), RATE(B), and RATE(C) compare to each other. Variations of step 316 (e.g., 316A-H) and step 318 (e.g., 318A-H) may be performed depending on the possible scenarios illustrated in FIGS. 4-11 and, as such, FIGS. 4-11 are used herein to discuss variations of step 316 and step 318.

Figure 4:
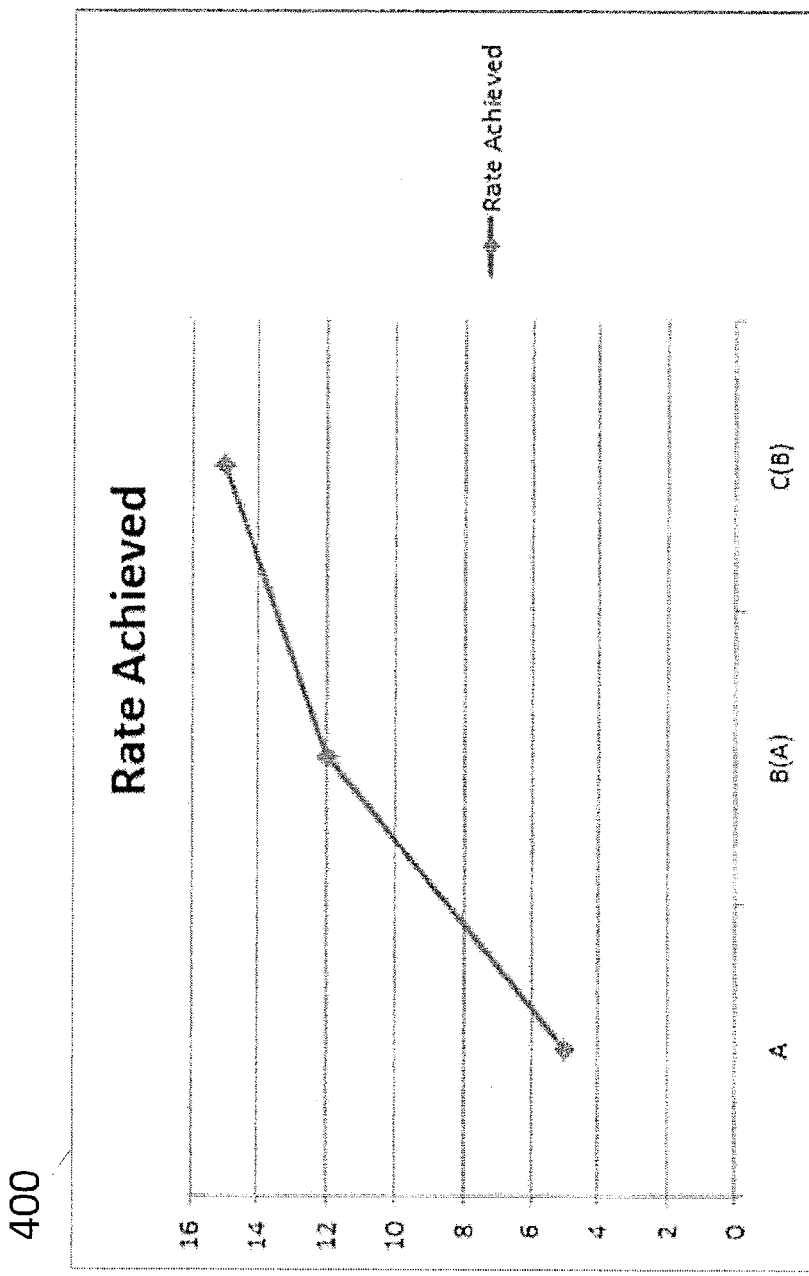
FIGS. 4-11 are diagrams illustrating various exemplary scenarios associated with determining an optimum virtual thread count for obtaining a target operations rate according to an embodiment of the subject matter described herein.

At step 316A, comparing RATE(A), RATE(B), and RATE (C) may indicate that RATE(C) is greater than RATE(B) and RATE(B) is greater than RATE(A) as illustrated in FIG. 4. In response to this scenario, virtual thread count 'A' may be set to the value of virtual thread count 'B', virtual thread count 'B' may be set to the value of virtual thread count 'C', and virtual thread count 'C' may be set to the value of virtual thread count 'C' multiplied by two. After setting the new value of virtual thread count 'C', a number of virtual threads indicated by the new value of virtual thread count 'C' may be concurrently executed for testing DUT 102 and a new RATE (C) may be determined or derived.

At step 318A, if new RATE(C) is close to a target operations rate, step 306 may be performed. If new RATE(C) is not close to a target operations rate, a variation of step 316 may be performed depending on the relevant comparison scenario. For example, if new RATE(C) is greater than RATE(B) and RATE(B) is greater than RATE(A), step 316A may be repeated.

Figure 5:
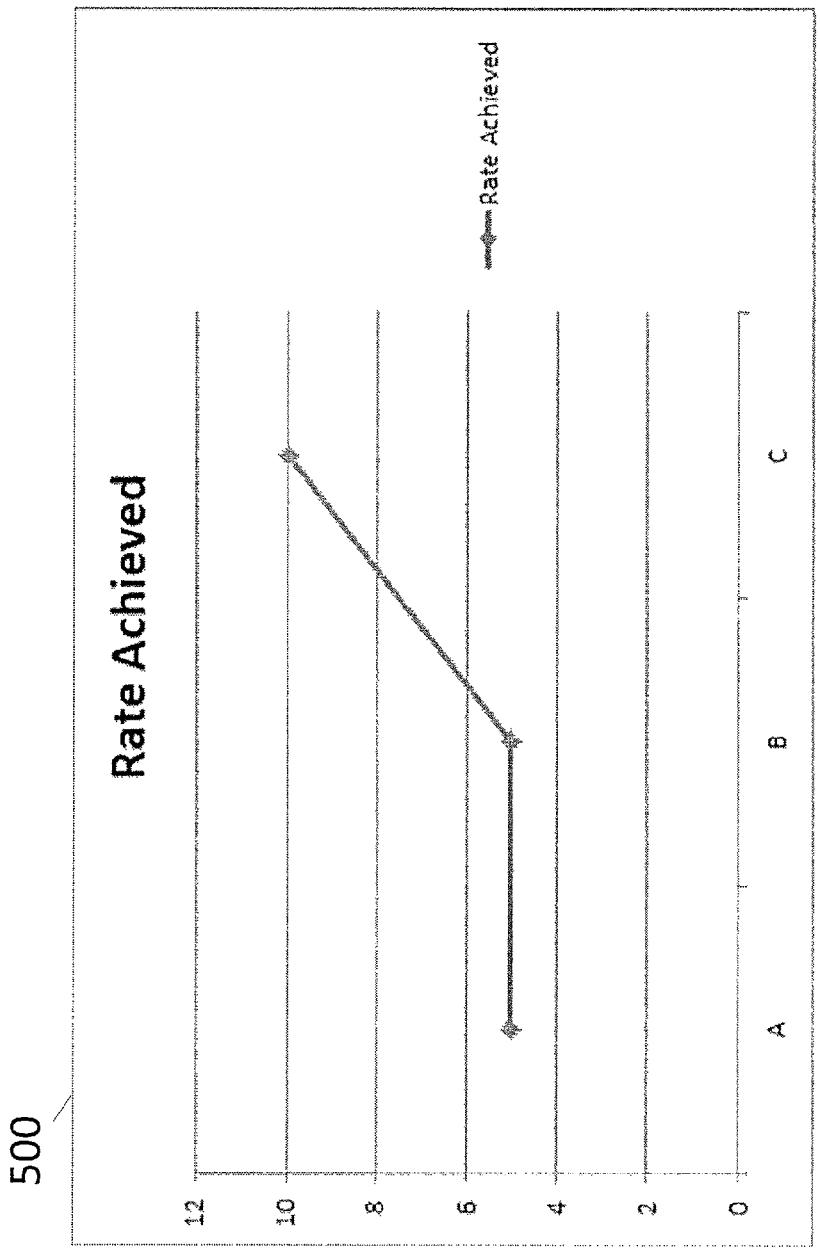

At step 316B, comparing RATE(A), RATE(B), and RATE (C) may indicate that RATE(C) is greater than RATE(B) and RATE(B) is equal to RATE(A) as illustrated in FIG. 5. In response to this scenario, virtual thread count 'A' may be set to the value of virtual thread count 'B', virtual thread count 'B' may be set to the value of virtual thread count 'C', and virtual thread count 'C' may be set to the value of virtual thread count 'C' multiplied by two. After setting the new value of virtual thread count 'C', a number of virtual threads indicated by the new value of virtual thread count 'C' may be concurrently executed for testing DUT 102 and a new RATE (C) may be determined or derived.

At step 318B, if new RATE(C) is close to a target operations rate, step 306 may be performed. If new RATE(C) is not close to a target operations rate, a variation of step 316 may be performed depending on the relevant comparison scenario. For example, if new RATE(C) is greater than RATE(B) and RATE(B) is greater than RATE(A), then step 316A may be performed. In another example, if new RATE(C) is greater than RATE(B) and RATE(B) is equal to RATE(A), step 316B may be repeated.

Figure 6:
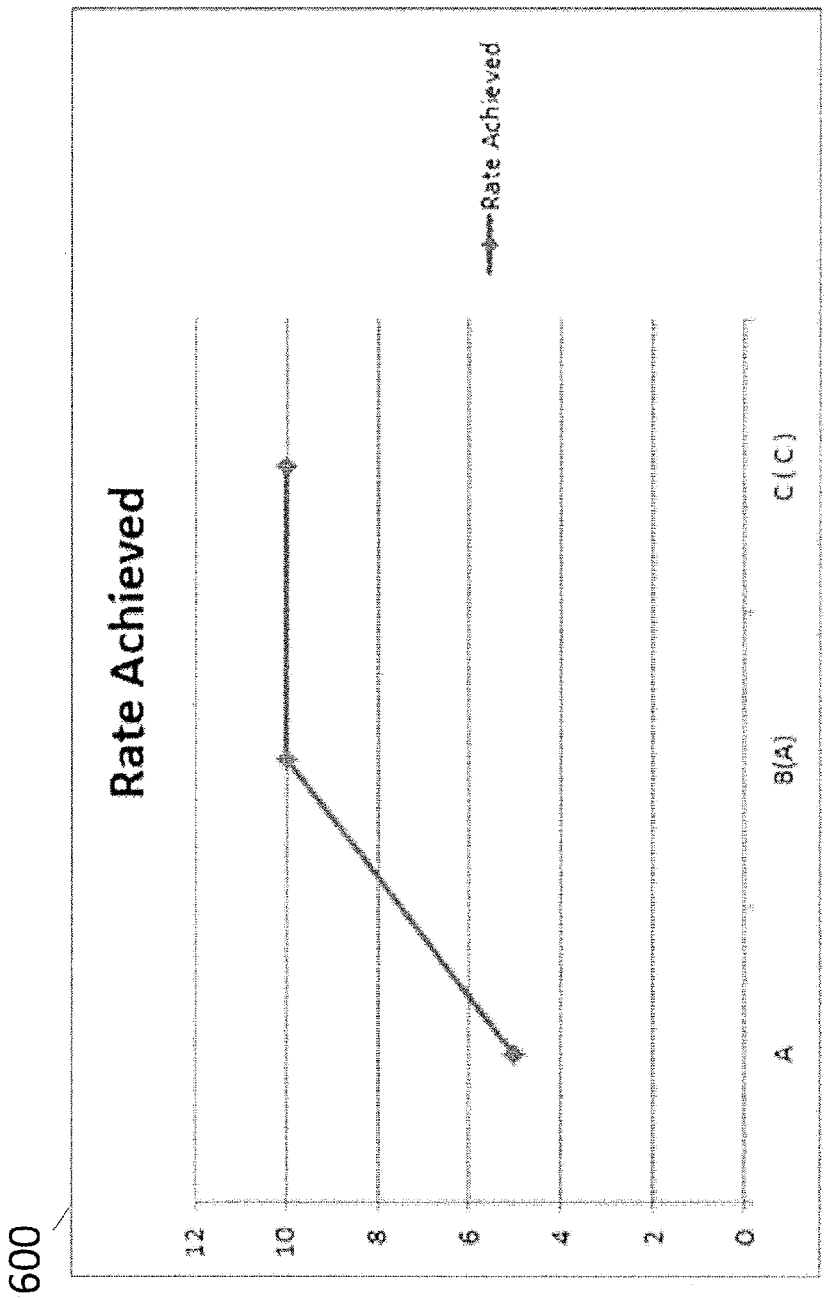

At step 316C, comparing RATE(A), RATE(B), and RATE (C) may indicate that RATE(C) is equal to RATE(B) and RATE(B) is greater than RATE(A) as illustrated in FIG. 6. In response to this scenario, virtual thread count 'A' may be set to the value of virtual thread count 'B', virtual thread count 'B' may be set to half the sum of the value of virtual thread count 'B' and the value of virtual thread count 'C' ((B+C)/2), and virtual thread count 'C' may be unchanged. After setting the new value of virtual thread count 'B', a number of virtual threads indicated by the new value of virtual thread count 'B' may be concurrently executed for testing DUT 102 and a new RATE(B) may be determined or derived.

In some embodiments, virtual thread counts may not be adjusted and a current virtual thread count may be determined as a most optimal virtual thread count. For example, during a testing period, a limit associated with the number of changes to a virtual thread count may be reached. In this example, after the limit is reached, step 306 may be performed.

In some embodiments, if a load adjustment algorithm is attempting to select a value for a new virtual thread count between two current virtual thread counts (between virtual thread counts 'A' and 'B' or between virtual thread counts 'B' and 'C') but there is no integer values between the two current virtual thread counts (e.g., 'A'<='B'<='A'+1, or 'B'<='C'<='B'+1), step 306 may be performed. For example, step 306 may be performed when a maximum operations rate has been achieved but is below a target operations rate. In another example, step 306 may be performed when a computed value for a virtual thread count is the same as a current thread count or when the computed value rounds to a current thread count.

At step 318C, if new RATE(B) is close to a target operations rate, step 306 may be performed. If new RATE(B) is not close to a target operations rate, a variation of step 316 may be performed depending on the relevant comparison scenario. For example, if RATE(A) is less than RATE(B) and RATE(B) is greater than RATE(C), step 316E may be performed.

Figure 7:
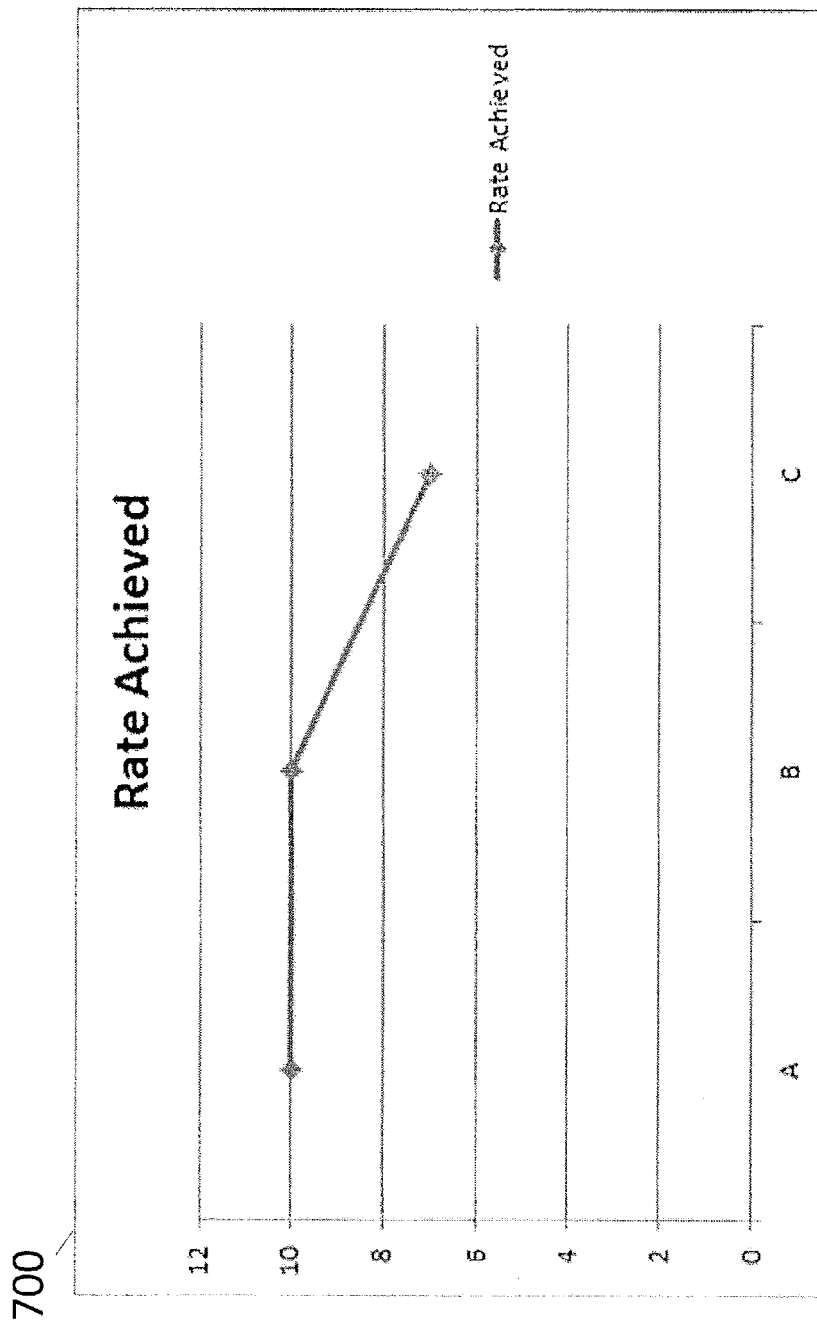

At step 316D, comparing RATE(A), RATE(B), and RATE(C) may indicate that RATE(A) is equal to RATE(B) and RATE(B) is greater than RATE(C) as illustrated in FIG. 7. In response to this scenario, virtual thread count 'C' may be set to the value of virtual thread count 'B', virtual thread count 'B' may be set to half the sum of the value of virtual thread count 'A' and the value of virtual thread count 'C' ((A+C)/2), and virtual thread count 'A' may be unchanged. After setting the new value of virtual thread count 'B', a number of virtual threads indicated by the new value of virtual thread count 'B' may be concurrently executed for testing DUT 102 and a new RATE(B) may be determined or derived.

At step 318D, if new RATE(B) is close to a target operations rate, step 306 may be performed. If new RATE(B) is not close to a target operations rate, a variation of step 316 may be performed depending on the relevant comparison scenario. For example, if RATE(A) is less than RATE(B) and RATE(B) is greater than RATE(C), step 316E may be performed.

Figure 8:
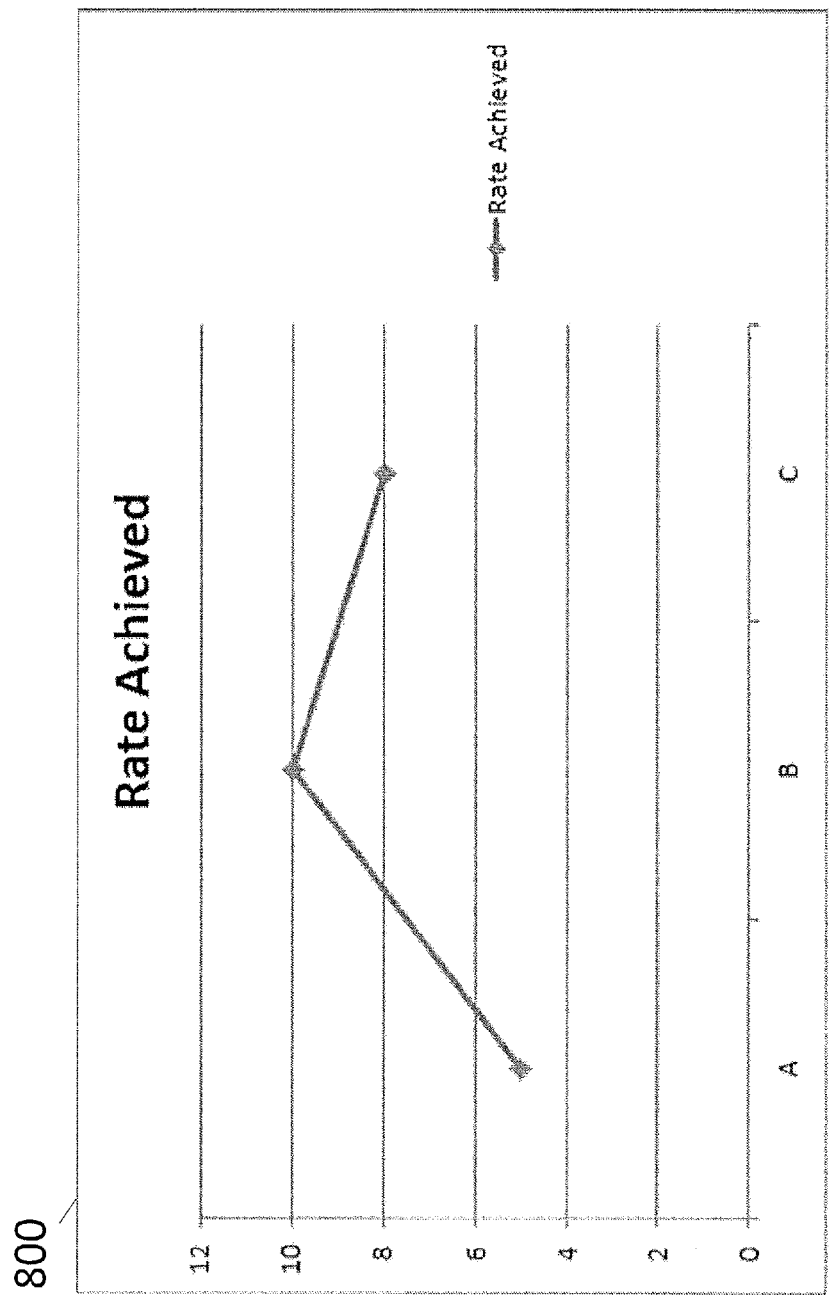

At step 316E, comparing RATE(A), RATE(B), and RATE(C) may indicate that RATE(A) is less than RATE(B) and RATE(B) is greater than RATE(C) as illustrated in FIG. 8. In response to this scenario, a virtual thread count 'A-prime' may be set to half the sum of the value of virtual thread count 'A' and the value of virtual thread count 'B' ((A+B)/2), a virtual thread count 'C-prime' may be set to half the sum of the value of virtual thread count 'B' and the value of virtual thread count 'C' ((B+C)/2). After setting the new value of virtual thread count 'A-prime', a number of virtual threads indicated by the new value of virtual thread count 'A-prime' may be concurrently executed for testing DUT 102 and a new RATE(A-prime) may be determined or derived.

At step 318E, if new RATE(A-prime) is close to a target operations rate, step 306 may be performed. If new RATE(A-prime) is not close to a target operations rate, step 320 may be performed with virtual thread count 'C-prime'.

At step 320, a number of virtual threads indicated by the value of virtual thread count 'C-prime' may be concurrently executed for testing DUT 102 and a new RATE(C-prime) may be determined or derived.

At step 322, if new RATE(C-prime) is close to a target operations rate, step 306 may be performed. If new RATE(C-prime) is not close to a target operations rate, step 324 may be performed.

At step 324, RATE(A-prime), RATE(B) and RATE(C-prime) may be compared. If RATE(A-prime) is greater than or equal to RATE(B) and RATE(C-prime) then virtual thread count 'C' may be set to the value of virtual thread count 'B', virtual thread count 'B' may be set to the value of virtual thread count 'A-prime' and virtual thread count 'A' may be unchanged. If RATE(B) is greater than RATE(B) and RATE(B) is greater than or equal to RATE(C-prime) then virtual thread count 'C' may be set to the value of virtual thread count 'C-prime', virtual thread count 'A' may be set to the value of virtual thread count 'A-prime' and virtual thread count 'B' may be unchanged. If RATE(C-prime) is greater than RATE(B) and RATE(A-prime) then virtual thread count 'B' may be set to the value of virtual thread count 'A', virtual thread count 'B' may be set to the value of virtual thread count 'C-prime' and virtual thread count 'C' may be unchanged. After shuffling the virtual thread counts around, a variation of step 316 (e.g., step 316A-H) may be performed depending on the relevant comparison scenario.

Figure 9:
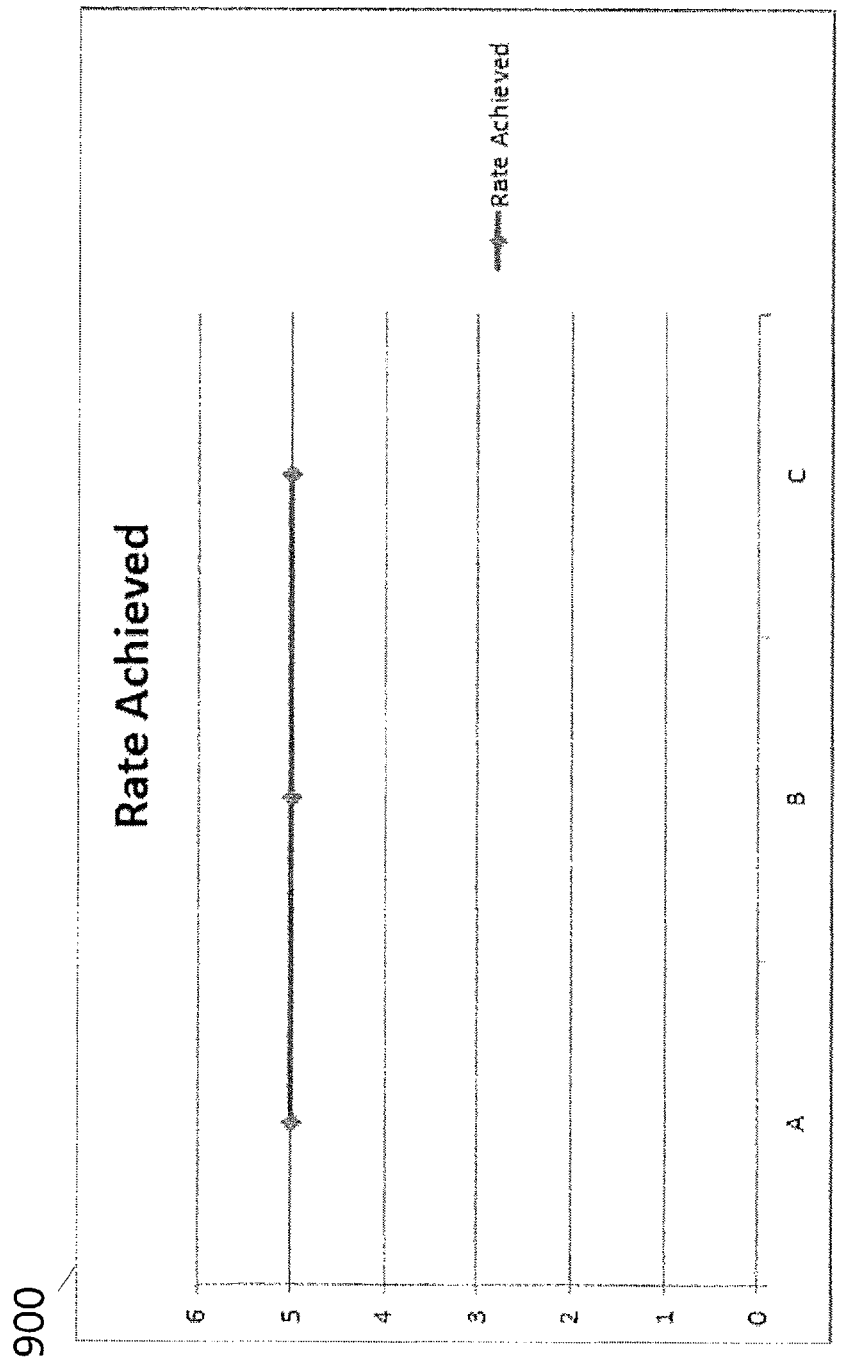

At step 316F, comparing RATE(A), RATE(B), and RATE(C) may indicate that RATE(A) is equal to RATE(B) and RATE(B) is equal to RATE(C) as illustrated in FIG. 9. In response to this scenario, step 326 may be performed.

Figure 10:
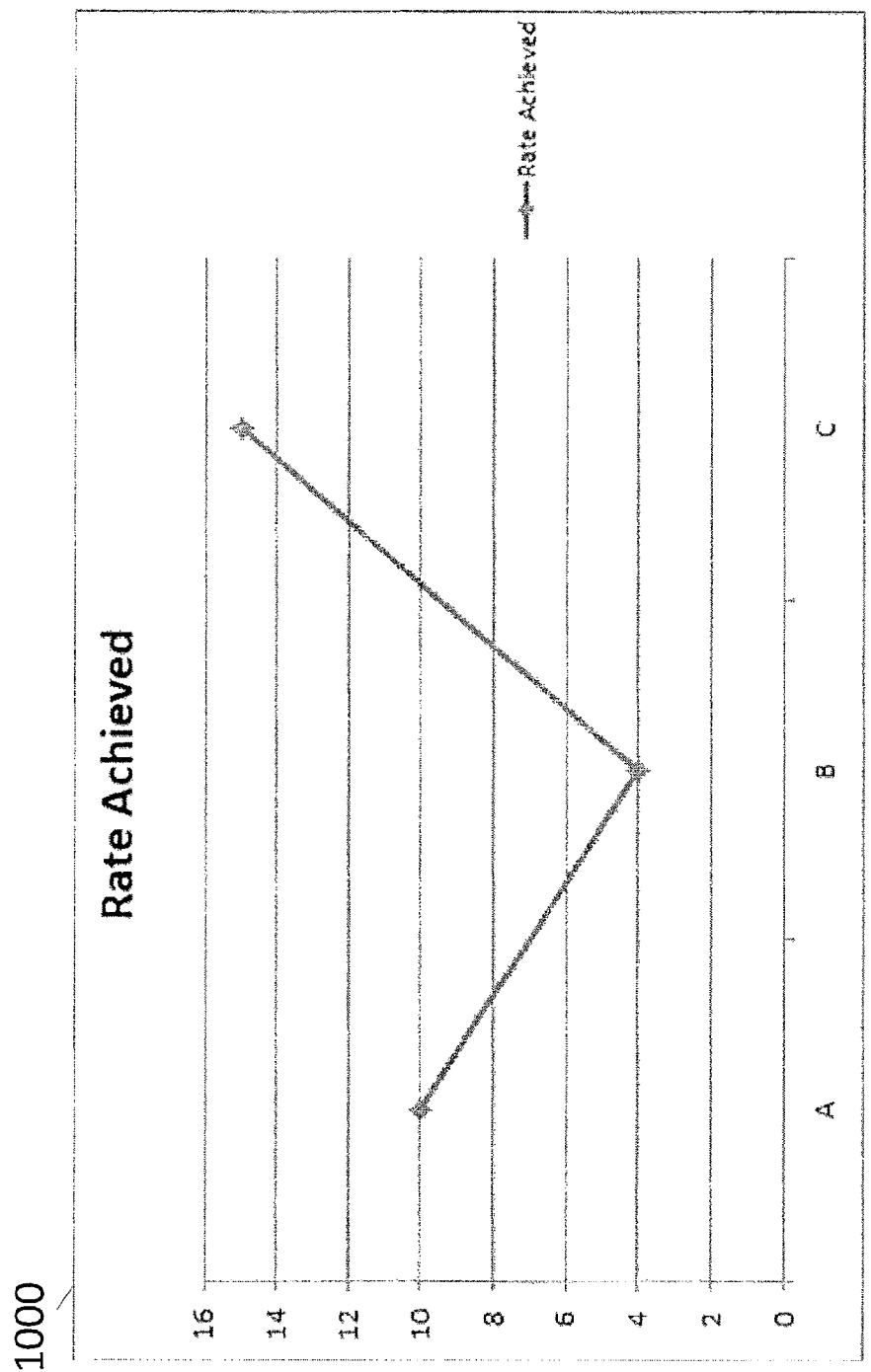

At step 316G, comparing RATE(A), RATE(B), and RATE(C) may indicate that RATE(A) is greater than RATE(B) and RATE(B) is less than RATE(C) and RATE(A) is less than RATE(C) as illustrated in FIG. 10. In response to this scenario, step 326 may be performed.

Figure 11:
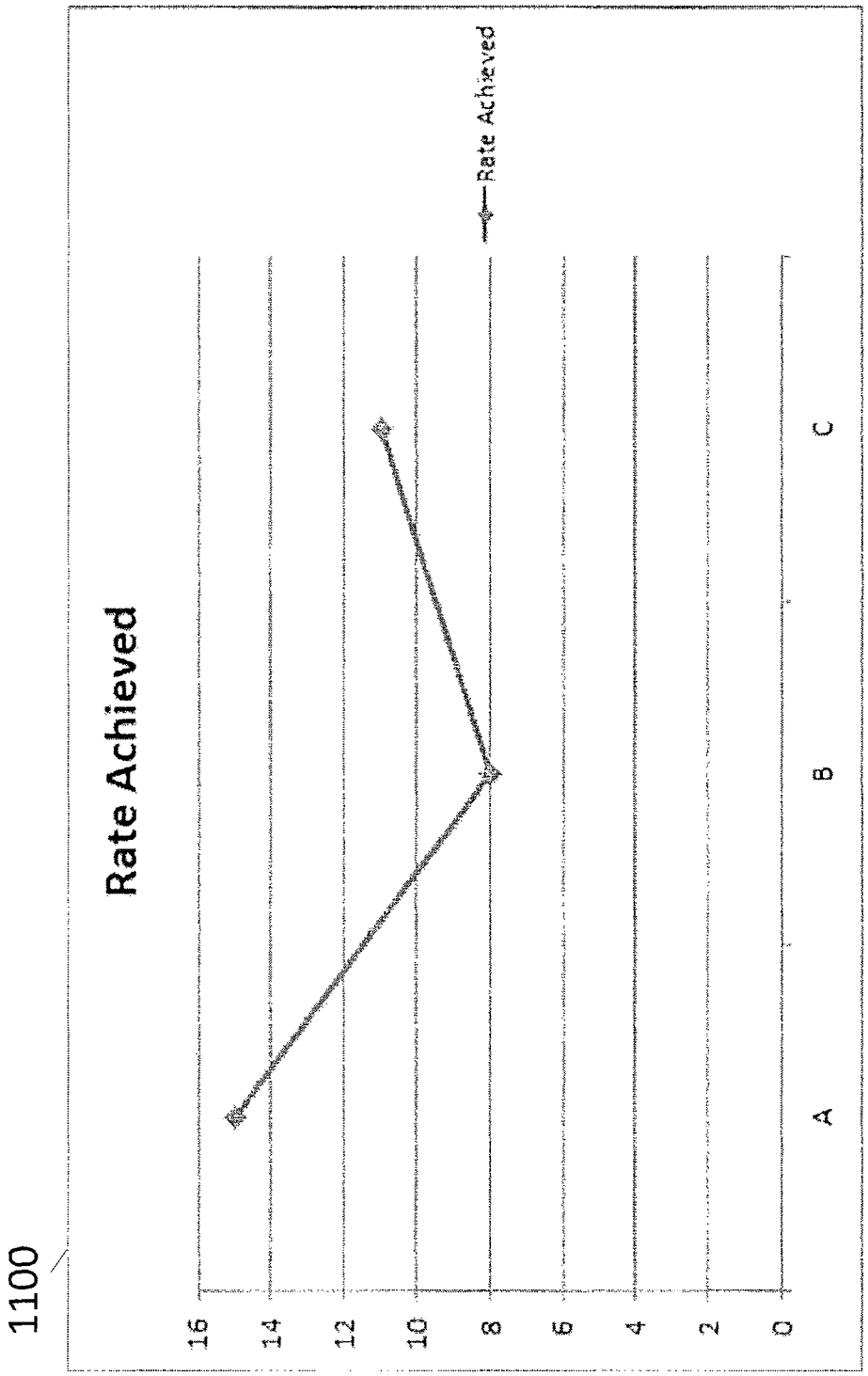

At step 316H, comparing RATE(A), RATE(B), and RATE(C) may indicate that RATE(A) is greater than RATE(B) and RATE(B) is less than RATE(C) and RATE(A) is greater than RATE(C) as illustrated in FIG. 11. In response to this scenario, step 326 may be performed.

At step 326, virtual thread count 'B' may be set to the value of virtual thread count 'A' if RATE(A) is highest among RATE(A), RATE(B) and RATE(C), or virtual thread count 'B' may be unchanged if RATE(B) is highest among RATE(A), RATE(B) and RATE(C), or virtual thread count 'B' may be set to the value of virtual thread count 'C' if RATE(C) is highest among RATE(A), RATE(B) and RATE(C). After setting the value of virtual thread count 'B', a number of virtual threads indicated by the new value of virtual thread count 'B' may be concurrently executed for testing DUT 102. In some embodiments, additional monitoring may be performed and, if RATE(B) drops, step 328 may be performed. For example, a moving average of an operations rate associated with DUT 102 may be monitored and maintained and, if the rate drop below a certain threshold value, additional adjustment may be performed using re-seek step 328.

In some embodiments, step 326 may be performed when an error or failure occurs. For example, step 326 may be performed if one or more operations rates appear to be inaccurate or cannot be determined.

At step 328, a re-seek operation may be performed to adjust a current operations rate and attempt to obtain a target operations rate or load. The re-seek operation may include setting virtual thread count 'A' to half the value of virtual thread count 'B'. After setting the new value of virtual thread count 'A', a number of virtual threads indicated by the new value of virtual thread count 'A' may be concurrently executed for testing DUT 102 and a new RATE(A) may be determined or derived.

At step 330, if new RATE(A) is close to a target operations rate, step 306 may be performed. If new RATE(A) is not close to a target operations rate, virtual thread count 'C' may be set to the value of virtual thread count 'B' multiplied by two and step 332 may be performed.

At step 332, a number of virtual threads indicated by the value of virtual thread count 'C' may be concurrently executed for testing DUT 102 and a new RATE(C) may be determined or derived.

At step 334, if new RATE(C) is close to a target operations rate, step 306 may be performed. If new RATE(C) is not close to a target operations rate, a variation of step 316 may be performed depending on the relevant comparison scenario.

It will be appreciated that the above described process is for illustrative purposes. In some embodiments, process 300 may include additional and/or different processing steps and/or steps may occur in a different temporal order.

Figure 12:
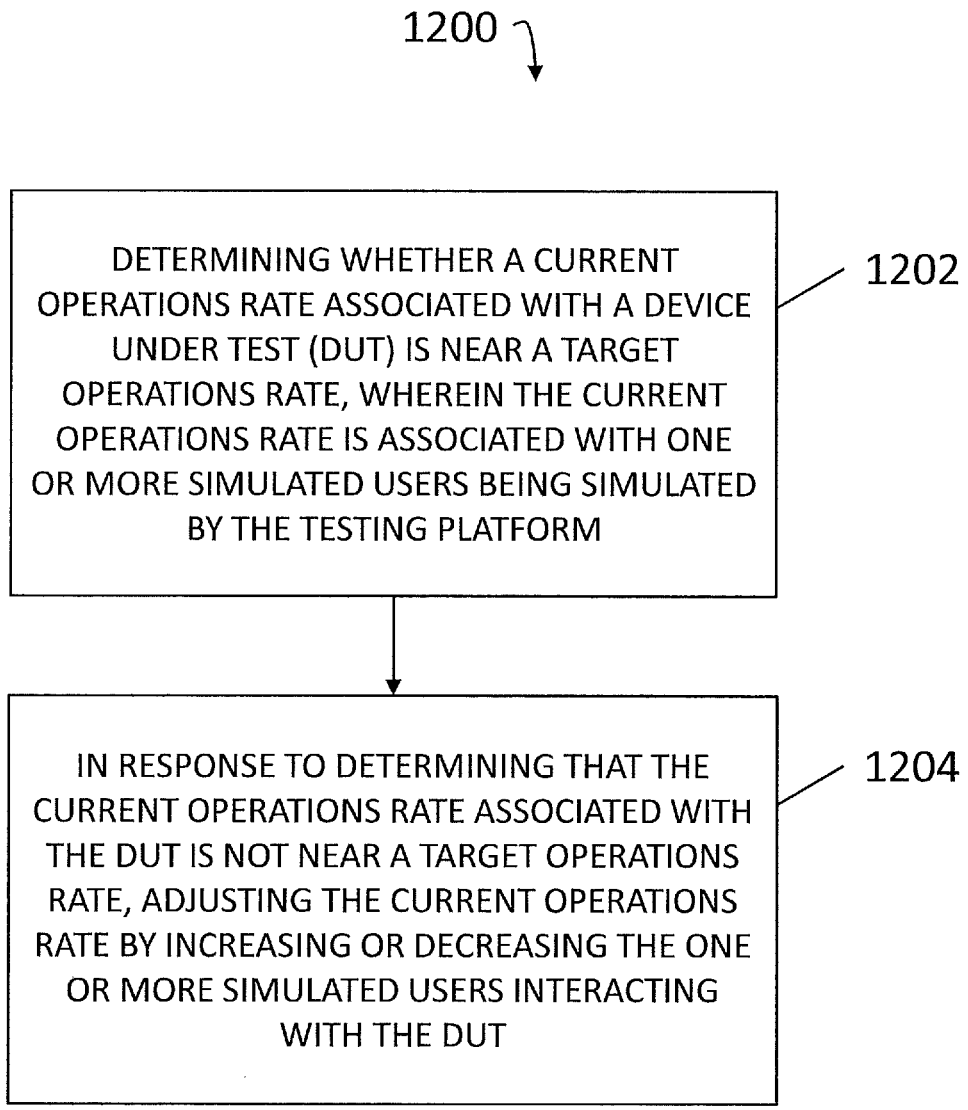
FIG. 12 is a diagram illustrating an exemplary process for adjusting load at a device under test according to an embodiment of the subject matter described herein.

FIG. 12 is a diagram illustrating an exemplary process 1200 for processing multiple control and user data flows at processor 110 according to an embodiment of the subject matter described herein. In some embodiments, exemplary process 1200, or portions thereof, may be performed by or at testing platform 108, a multi-UE simulator, I/O 106, processor 110, simulation manager 112, load adjustment controller 114, and/or another node or module.

At step 1202, it may be determined whether a current operations rate associated with DUT 102 is near a target operations rate. The current operations rate may be associated with one or more simulated users being simulated by the testing platform. For example, an operations rate may indicate a number of actions or commands performed per second by DUT 102, where the actions or commands performed are related to communications between the simulated users and DUT 102.

In some embodiments, a current operations rate may include a connection establishment rate, a layer 7 transaction rate, a layer 7 byte exchange or throughput rate, or a combination of two or more rates.

In some embodiments, a current operations rate may be associated with a number of operations per second (OPS).

In some embodiments, a target operations rate may be a maximum operations rate obtainable for a current configuration.

At step 1204, in response to determining that the current operations rate associated with DUT 102 is not near a target operations rate, the current operations rate may be adjusted by increasing or decreasing the number of simulated users interacting with DUT 102.

In some embodiments, determining that a current operations rate associated with DUT 102 is near a target operations rate may include determining that the difference between the current operations rate and the target operations rate is below a threshold value and/or determining that the current operations rate does not exceed the target operations rate.

In some embodiments, adjusting a current operations rate by increasing or decreasing the one or more simulated users interacting with DUT 102 may include multiplying by two the current number of simulated users or dividing by two the sum of the current number of simulated users and a previous number of simulated users.

In some embodiments, a simulated user may be associated with a virtual thread. For example, increasing the number of simulated users by one may increase the number of virtual threads being executed by one and decreasing the number of simulated users by one may decrease the number of virtual threads being executed by one. In another example, simulated users may be correlated with virtual threads but may not be perfectly correlated.

In some embodiments, a virtual thread may include a sequence of layer 7 protocol actions or commands.

In some embodiments, one or more simulated users may utilize one or more processors 110 in testing platform 108.

In some embodiments, testing platform 108 may include two or more processors 110 and/or two or more NICs, two or more simulated users may be distributed among the two or more processors 110, and a current operations rate may be based on the sum of operations rates associated with the two or more processors 110.

In some embodiments, DUT 102 may include an evolved packet core (EPC) network node, a serving gateway, a packet data network gateway, a network node, a BTS, a node B, an eNode B, a WiMAX base station, a server load balancer, a firewall, or a deep packet inspection device.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for adjusting load at a device under test, the method comprising:
   at a testing platform:
      determining whether a current operations rate associated with a device under test (DUT) is near a target operations rate, wherein the current operations rate is associated with one or more simulated users being simulated by the testing platform; and
      in response to determining that the current operations rate associated with the DUT is not near a target operations rate, adjusting the current operations rate by increasing or decreasing the number of simulated users interacting with the DUT,
      wherein adjusting the current operations rate by increasing or decreasing the number of simulated users interacting with the DUT includes multiplying by a predetermined value the current number of simulated users and/or virtual threads or dividing by the predetermined value the sum of the current number of simulated users and/or virtual threads and a previous number of simulated users and/or virtual threads.

2. The method of claim 1 wherein the current operations rate includes a connection establishment rate, a layer 7 transaction rate, a layer 7 byte exchange or throughput rate, or a combination of two or more rates.

3. The method of claim 1 wherein the current operations rate is associated with a number of operations per second (OPS).

4. The method of claim 1 wherein the target operations rate is a maximum operations rate obtainable for a current configuration.

5. The method of claim 1 wherein determining that the current operations rate associated with the DUT is near the target operations rate includes determining that the difference between the current operations rate and the target operations rate is below a threshold value and determining that the current operations rate does not exceed the target operations rate.

6. The method of claim 1 wherein each of the one or more simulated users is associated with a virtual thread.

7. The method of claim 1 wherein the virtual thread includes a sequence of layer 7 protocol actions or commands.

8. The method of claim 1 wherein the one or more simulated users utilize one or more processors in the testing platform.

9. The method of claim 1 wherein the testing platform includes two or more processors, wherein two or more simulated users are distributed among the two or more processors, and wherein the current operations rate is based on a sum of operations rates associated with the two or more processors or a plurality of network interface cards (NICs).

10. The method of claim 1 wherein the DUT includes an evolved packet core (EPC) network node, a serving gateway, a packet data network gateway, a network node, a base transceiver station (BTS), a node B, an evolved Node B (eNode B), a WiMAX base station, a server load balancer, a firewall, or a deep packet inspection device.

11. A system for adjusting load at a device under test, the system comprising:
 a testing platform:
  a load adjustment controller comprising at least one processor and memory, the load adjustment controller configured to determine whether a current operations rate associated with a device under test (DUT) is near a target operations rate, wherein the current operations rate is associated with one or more simulated users being simulated by the testing platform, and in response to determining that the current operations rate associated with the DUT is not near a target operations rate, to adjust the current operations rate by increasing or decreasing the number of simulated users interacting with the DUT, wherein the load adjustment controller is configured to adjust the current operations rate by increasing or decreasing the number of simulated users interacting with the DUT by multiplying by a predetermined value the current number of simulated users and/or virtual threads or dividing by the predetermined value the sum of the current number of simulated users and/or virtual threads and a previous number of simulated users and/or virtual threads.

12. The system of claim 11 the current operations rate includes a connection establishment rate, a layer 7 transaction rate, a layer 7 byte exchange or throughput rate, or a combination of two or more rates.

13. The system of claim 11 wherein the current operations rate is associated with a number of operations per second (OPS).

14. The system of claim 11 wherein the target operations rate is a maximum operations rate obtainable for a current configuration.

15. The system of claim 11 wherein the load adjustment controller is configured to determine that the current operations rate associated with the DUT is near the target operations rate by determining that the difference between the current operations rate and the target operations rate is below a threshold value and determining that the current operations rate does not exceed the target operations rate.

16. The system of claim 11 wherein each of the one or more simulated users is associated with a virtual thread.

17. The system of claim 11 wherein the virtual thread includes a sequence of layer 7 protocol actions or commands.

18. The system of claim 11 wherein the one or more simulated users utilize one or more processors in the testing platform.

19. The system of claim 11 wherein the testing platform includes two or more processors and wherein the testing platform is configured to distribute two or more simulated users among the two or more processors and wherein the load adjustment controller is configured to calculate the current number of simulated user by aggregating operations rates associated with the two or more processors.

20. The system of claim 11 wherein the DUT includes an evolved packet core (EPC) network node, a serving gateway, a packet data network gateway, a network node, a base transceiver station (BTS), a node B, an evolved Node B (eNode B), a WiMAX base station, a server load balancer, a firewall, or a deep packet inspection device.

21. A non-transitory computer readable medium comprising computer executable instructions embodied in a computer readable medium that when executed by a processor of a computer control the computer to perform steps comprising:
 at a testing platform:
  determining whether a current operations rate associated with a device under test (DUT) is near a target operations rate, wherein the current operations rate is associated with one or more simulated users being simulated by the testing platform; and
  in response to determining that the current operations rate associated with the DUT is not near a target operations rate, adjusting the current operations rate by increasing or decreasing the number of simulated users interacting with the DUT,
  wherein adjusting the current operations rate by increasing or decreasing the number of simulated users interacting with the DUT includes multiplying by a predetermined value the current number of simulated users and/or virtual threads or dividing by the predetermined value the sum of the current number of simulated users and/or virtual threads and a previous number of simulated users and/or virtual threads.

* * * * *